(12) United States Patent
Sugiyama et al.

(10) Patent No.: US 8,491,141 B2
(45) Date of Patent: Jul. 23, 2013

(54) PHOTOLUMINESCENT MATERIAL CONTAINING SILVER ION

(75) Inventors: Kouju Sugiyama, Osaka (JP); Wuxian Zhang, Osaka (JP); Kaoru Yamaguchi, Osaka (JP)

(73) Assignee: Rengo Co., Ltd., Osaka (JP)

( * ) Notice: Subject to any disclaimer, the term of this patent is extended or adjusted under 35 U.S.C. 154(b) by 215 days.

(21) Appl. No.: 13/191,713

(22) Filed: Jul. 27, 2011

(65) Prior Publication Data

US 2012/0026719 A1 Feb. 2, 2012

(30) Foreign Application Priority Data

Aug. 2, 2010 (JP) ................................. 2010-173726

(51) Int. Cl.
*F21V 33/00* (2006.01)
(52) U.S. Cl.
USPC .......................................................... 362/84
(58) Field of Classification Search
USPC .......................................................... 362/84
See application file for complete search history.

(56) References Cited

U.S. PATENT DOCUMENTS

| | | | | |
|---|---|---|---|---|
| 5,772,917 | A * | 6/1998 | Kynast et al. | 252/301.4 R |
| 5,900,695 | A * | 5/1999 | Kynast et al. | 313/486 |
| 8,283,845 | B2 * | 10/2012 | Itou et al. | 313/116 |
| 2008/0093616 | A1 | 4/2008 | Shinozaki et al. | |
| 2011/0174288 | A1 * | 7/2011 | Hanaoka et al. | 126/58 |

FOREIGN PATENT DOCUMENTS

| | | |
|---|---|---|
| JP | 10-095612 | 4/1998 |
| JP | 2000-516296 | 12/2000 |
| JP | 2005-048107 | 2/2005 |
| JP | 2006-253641 | 9/2006 |
| JP | 2008-069290 | 3/2008 |
| WO | 98/55562 | 12/1998 |
| WO | 2009/006707 | 1/2009 |
| WO | 2009/006709 | 1/2009 |

OTHER PUBLICATIONS

H. Hoshino et al., "Photoluminescence of Colored 12Ag-A Zeolite Packed under Air", Bull. Fac. Educ. Hirosaki University, vol. 99, pp. 55-62, Mar. 2008.
G. DeCremer et al., "Characterization of Fluorescence in Heat-Treated Silver-Exchanged Zeolites", J. Am. Chem. Soc., vol. 131, pp. 3049-3056, 2009.
G. DeCremer et al., "In Situ Observation of the Emission Characteristics of Zeolite-Hosted Silver Species During Heat Treatment", ChemPhysChem., vol. 11, pp. 1627-1631, 2010.
Nikkei Sangyo Shimbun, "Fluorescent Material Obviating the Need for Rare Earths" along with English translation, Dec. 24, 2010.
"Three-Color Fluorescent Material Obviating the Need for Earths", Ceramics Japan, Bulletin of the Ceramic Society of Japan, vol. 46, No. 5 along with English translation, 2011.
Japanese Office Action issued Mar. 19, 2013 in corresponding Japanese Application No. 2011-164754.
Chen, Wei, et al., "Photostimulated luminescence of silver clusters in zeolite-Y", Physics Letters A, vol. 232, pp. 391-394, 1997.
Chen, Wei, et al., "Photostimulated luminescence and dynamics of AgI and Ag nanoclusters in zeolites", Physical Review B, vol. 65, pp. 245404-1-245404-8, 2002.

* cited by examiner

*Primary Examiner* — Laura Tso
(74) *Attorney, Agent, or Firm* — Wenderoth, Lind & Ponack, L.L.P.

(57) ABSTRACT

The present invention provides a silver ion-containing faujasite type zeolite which is a photoluminescent material that emits a visible light by irradiation of ultraviolet ray.

9 Claims, No Drawings

PHOTOLUMINESCENT MATERIAL CONTAINING SILVER ION

TECHNICAL FIELD OF THE INVENTION

The present invention relates to a photoluminescent material containing a silver ion. Here, the "photoluminescent material" means a "material used for an application utilizing photoluminescence (i.e., phenomenon of visible light emission by UV-irradiation)".

BACKGROUND OF THE INVENTION

A photoluminescent material that emits a visible light (generally, light with a wavelength of not less than 380 nm and less than 830 nm) by UV-irradiation is used for lighting equipments, back light for liquid crystal devices and the like. As such photoluminescent material, those containing rare earth elements are often used (for example, patent documents 1-3). In addition, use of an iridium complex as a photoluminescent material has been proposed (for example, patent document 4). However, rare earth element and iridium are associated with problems in that the reservoirs are insufficient, producing countries are limited, and the cost of separation and refinement is high. Therefore, a photoluminescent material using an element other than those has been desired.

On the other hand, non-patent document 1 discloses that a tightly sealed zeolite A containing silver cluster exhibits photoluminescence. However, the document describes that maintenance of photoluminescence of the zeolite A containing silver cluster requires tight sealing with a glass ampoule, or with slide glass, cover glass and an epoxide-based adhesive. It describes that zeolite A containing silver cluster, which was left standing in air at room temperature for a long time without tight sealing, kept changing in coloration and luminescence, and finally lost luminescence. Therefore, practicalization of zeolite A containing silver cluster, described in the document, as a photoluminescent material has problems. In non-patent document 1, zeolite A containing silver is subjected to a heat treatment at 500° C. for 24 hr to allow formation of silver cluster, whereby zeolite A containing silver cluster is produced.

Patent documents 5 and 6 describe an invention that utilizes conversion of ultraviolet ray to a visible light by irradiation of invisible radiation (ultraviolet ray) to molecular sieves containing oligo atomic metal clusters. In patent documents 5 and 6, silver cluster is described as oligo atomic metal clusters, and small pore zeolites such as zeolite 3A and the like, and large pore zeolites such as faujasites X and Y and the like are described as molecular sieves. However, both patent documents 5 and 6 actually confirmed photoluminescence only in zeolite 3A (i.e., small pore zeolites) containing silver cluster. Specifically, in Example 3 of patent document 5 and Example 1 of patent document 6, zeolite 3A containing silver cluster was produced by heat-treating silver-exchanged zeolite 3A at 450° C. for 24 hr to allow formation of silver cluster, as in non-patent document 1, and the photoluminescence of the zeolite was confirmed. Therefore, patent documents 5 and 6 have not confirmed that large pore zeolites (e.g., faujasites X and Y) containing silver cluster exhibit photoluminescence. In view thereof, in the Japanese application (JP-A-2010-532911) corresponding to patent document 5, the "molecular sieves" in claim 1 at the time of filing the application were limited to small pore zeolites such as zeolite 3A, etc., and large pore zeolites such as faujasites X and Y were eliminated from the claims thereof by the Amendment of Mar. 16, 2010.

DOCUMENT LIST

[Patent Documents]
patent document 1: JP-A-2000-516296
patent document 2: JP-A-2005-48107
patent document 3: JP-A-2008-69290
patent document 4: JP-A-2006-253641
patent document 5: WO2009/006707
patent document 6: WO2009/006709
[Non-Patent Document]
non-patent document 1: HOSHINO et al., "Photoluminescence of Colored 12Ag-A Zeolite Packed under Air", Bull. Fac. Educ. Hirosaki Univ. 99, 2008, pp. 55-62, issued date: Mar. 25, 2008

SUMMARY OF THE INVENTION

Problems to be Solved by the Invention

The present invention has been made by taking note of the above-mentioned situation, and aims to provide a photoluminescent material that can be produced from a stably obtainable starting material.

Means of Solving the Problems

The present inventors have conducted intensive studies in an attempt to achieve the above-mentioned object and found that a faujasite type zeolite containing silver ion rather than the silver cluster described in non-patent document 1 and the like exhibits photoluminescence, which resulted in the completion of the present invention. The present invention is as described below:

[1] A photoluminescent material, which is a silver ion-containing faujasite type zeolite and emits a visible light by irradiation of ultraviolet ray.

[2] The photoluminescent material of the above-mentioned [1], which emits a visible light by irradiation of ultraviolet ray having a wavelength of not less than 200 nm and less than 380 nm.

[3] The photoluminescent material of the above-mentioned [1] or [2], wherein the silver ion content is more than 1 wt % and not more than 30 wt % of the whole photoluminescent material.

[4] The photoluminescent material of any one of the above-mentioned [1]-[3], wherein the faujasite type zeolite is zeolite X.

[5] The photoluminescent material of any one of the above-mentioned [1]-[4], further comprising at least one selected from the group consisting of zinc ion, calcium ion, magnesium ion and potassium ion.

[6] The photoluminescent material of any one of the above-mentioned [1]-[4], further comprising calcium ion.

[7] A lighting equipment comprising an ultraviolet light source and the photoluminescent material of any one of the above-mentioned [1]-[6].

[8] The lighting equipment of the above-mentioned [7], which is a back light for a liquid crystal display device.

[9] The photoluminescent material of any one of the above-mentioned [1]-[6], for use for elimination of nitrogen oxide.

Effect of the Invention

Since the photoluminescent material of the present invention comprises silver and faujasite type zeolite as starting materials, it can be supplied stably. In addition, the photoluminescent material of the present invention can exhibit photoluminescence even after long-term standing in air, unlike the silver cluster-containing zeolite A described in non-patent document 1 and the like.

DESCRIPTION OF EMBODIMENTS

The photoluminescent material of the present invention is a silver ion-containing faujasite type zeolite. Examples of the faujasite type zeolite include synthetic zeolites (zeolite X and zeolite Y), and natural zeolite, faujasite. Among these, zeolite X and zeolite Y are preferable, and zeolite X is more preferable. Whether zeolite is a faujasite type zeolite can be judged by a structural analysis of diffraction peak measured by powder X-ray diffractometry, a structural analysis of MAS (Magic-Angle Spinning) NMR spectrum measured by solid-state NMR and the like.

The rare earth element ion-containing zeolite which is a conventional photoluminescent material has a problem of decreased photoluminescence based on the rare earth element, since zeolite adsorbs moisture. To solve this problem in the conventional zeolite containing rare earth element ion, a heat treatment at about 1000° C. is performed to destroy the crystal structure of zeolite to prevent moisture adsorption (for example, patent documents 1 and 2). In contrast, the silver ion-containing zeolite X of the present invention characteristically exhibits photoluminescence even under wet conditions where moisture is present. Therefore, the silver ion-containing zeolite X provides advantage in that it exhibits photoluminescence even without drying after a silver ion exchange treatment of zeolite, or with drying at a low temperature. Furthermore, since the silver ion-containing zeolite X exhibits photoluminescence even under wet conditions where moisture is present, it provides advantage in that it can be applied to a broad range as compared to conventional rare earth element ion-containing zeolites.

As shown in the following Examples, the silver ion-containing zeolite Y of the present invention also provides advantage in that it exhibits photoluminescence by only drying at 100° C. after a silver ion exchange treatment. Therefore, the silver ion-containing zeolite Y of the present invention can set the drying temperature low as compared to conventional rare earth element ion-containing zeolites and the energy during production can be saved.

The particle size of the faujasite type zeolite is preferably 0.1-2 µm, more preferably 0.5-1.5 µm. The particle size can be measured by laser diffraction and laser scattering method. For the measurement, for example, a laser diffraction particle size analyzer:"SALD-2100" manufactured by SHIMADZU Corporation and the like can be used.

Faujasite type zeolites (faujasite, zeolite X and zeolite Y) are commercially available, and easily available. For example, zeolite X and zeolite Y used in the following Examples can be obtained from Tosoh Corporation.

The photoluminescent material of the present invention characteristically contains silver ion rather than silver cluster formed by a heat treatment at a high temperature for a long time. The silver ion content is preferably more than 1 wt %, more preferably not less than 3 wt %, still more preferably not less than 5 wt %, and preferably not more than 30 wt %, more preferably not more than 25 wt %, still more preferably not more than 20 wt %, of the whole photoluminescent material. The silver ion content can be measured as shown in the following Examples.

The photoluminescent material of the present invention may contain a metal ion other than silver ion (hereinafter sometimes to be abbreviated as "other metal ion") as long as the effect of the present invention (photoluminescence) is not inhibited. Other metal ion may be one kind or two or more kinds. Examples of such other metal ion include alkali metal ions such as sodium ion, potassium ion; and alkaline earth metal ions such as calcium ion, magnesium ion; zinc ion and the like. Of these other metal ions, calcium ion is preferable. The photoluminescent material of the present invention containing calcium ion in addition to silver ion tends to show increased luminescence intensity.

The photoluminescent material of the present invention can be produced by ion exchange of faujasite type zeolite, as mentioned below. Therefore, other metal ion may be ion possessed by faujasite type zeolite before ion exchange (e.g., alkali metal ion, alkaline earth metal ion). In addition, other metal ion may be introduced into the photoluminescent material of the present invention by ion exchange using an aqueous metal salt solution containing other metal ion.

When other metal ion is contained, the content thereof is preferably not less than 1 wt %, more preferably not less than 2 wt %, and preferably not more than 10 wt %, more preferably not more than 5 wt %, of the whole photoluminescent material. The content of other metal ion can be measured as shown in the following Examples.

As mentioned above, the photoluminescent material of the present invention can be produced by ion exchange of faujasite type zeolite. The ion exchange can be performed by stirring and retaining faujasite type zeolite in an aqueous solution containing silver ion. Examples of the aqueous solution containing silver ion include aqueous silver nitrate solution and the like. Moreover, the concentration of the aqueous solution containing silver ion can be adjusted as appropriate according to the design value of the silver ion content of the photoluminescent material of the present invention. The ion exchange can be performed at room temperature and the period thereof (i.e., stirring and retention time of zeolite in aqueous solution containing silver ion) is generally not less than 1 hr and not more than 10 hr, preferably not more than 5 hr.

The silver ion-containing faujasite type zeolite obtained by ion exchange is preferably filtered from dispersed water, washed with water and dried. The drying can be performed under air atmosphere and in an inert gas (for example, nitrogen gas) atmosphere or reduced pressure atmosphere. Of these, drying under air atmosphere is preferable since the operation can be performed conveniently. The drying time is generally not less than 1 hr and not more than 10 hr, preferably not more than 5 hr. The drying temperature is preferably not more than 300° C., more preferably not more than 200° C., and preferably not less than 50° C., more preferably not less than 100° C. Note that the silver ion-containing zeolite X exhibits photoluminescence even under wet conditions free of drying.

The silver ion-containing faujasite type zeolite obtained as mentioned above can further contain other metal ion by an ion exchange treatment comprising stirring and retaining the above zeolite in an aqueous solution containing other metal ion. Examples of the aqueous solution containing other metal ion include aqueous zinc sulfate solution, aqueous calcium nitrate solution, aqueous magnesium sulfate solution, aqueous potassium sulfate solution and the like. Other conditions for the metal ion exchange treatment are the same as those of the aforementioned silver ion exchange treatment.

The wavelength of the ultraviolet ray to be irradiated on the photoluminescent material of the present invention is preferably not less than 200 nm, more preferably not less than 220 nm, still more preferably not less than 250 nm, and preferably less than 380 nm, more preferably not more than 370 nm. The photoluminescent material of the present invention can emit a visible light with a peak wavelength within the range of preferably 370-720 nm, more preferably 400-550 nm, by irradiation of ultraviolet ray having a wavelength of 254 nm, and a visible light with a peak wavelength within the range of preferably 390-680 nm, more preferably 450-600 nm, by irradiation of ultraviolet ray having a wavelength of 365 nm.

The photoluminescent material of the present invention can be used for lighting equipments. Moreover, the photoluminescent material of the present invention can be used for a luminescent paint for forgery prevention of paper money, voucher, card and the like. Particularly the silver ion-containing zeolite X of the present invention is useful as a luminescent paint to be used for paper money and the like exposed to various environments, since it exhibits photoluminescence even under wet conditions where moisture is present.

Moreover, the photoluminescent material of the present invention integrated with fiber can also be utilized as a photoluminescent fiber (e.g., fluorescence fiber) for thread, paper, non-woven fabric, fabric and the like. The photoluminescent material of the present invention integrated with fiber can be produced by, for example, producing zeolite X integrated with fiber or zeolite Y integrated with fiber according to the methods described in JP-A-10-120923 and JP-A-2003-34753, and processing it to contain silver ion and, where necessary, other metal ion.

The photoluminescent material of the present invention to be used may be of one kind or two or more kinds in combination. Also, the photoluminescent material of the present invention may be used in combination with other photoluminescent material.

The present invention also provides a lighting equipment containing an ultraviolet light source and the photoluminescent material of the present invention. In the lighting equipment of the present invention, known ultraviolet light sources, for example, a mercury lamp and an LED can be used. As the ultraviolet light source, LED is preferable since it shows high energy efficiency and does not use mercury that causes environmental contamination.

The method of use of a photoluminescent material in a lighting equipment is not particularly limited. For example, an ultraviolet light source may be covered with glass, and the photoluminescent material may be fixed on the inside or outside the glass with a binder (for example, transparent epoxy resin). Particularly, since the photoluminescent material of the present invention has an ability to eliminate nitrogen oxide and the like besides the photoluminescence function, it can produce a lighting equipment having an illuminating function as well as an air cleaning function by fixing a photoluminescent material on the outside of the glass. Moreover, an ultraviolet light source may be covered with glass kneaded with the photoluminescent material of the present invention. Furthermore, a lighting equipment emitting a subdued light such as that of an oil lampstand with a wood frame and paper shade can be produced by covering an ultraviolet light source with paper kneaded with the photoluminescent material of the present invention.

The lighting equipment of the present invention can be used as lighting equipment for daily living such as fluorescent lamp, back light for a liquid crystal display device and the like. Moreover, since the sucking action and oviposition of Noctuidae, which is a noxious insect of fruits and vegetables, can be suppressed by a yellow light, a lighting equipment containing the photoluminescent material of the present invention emitting a yellow light as shown in the following Examples can be used to prevent damage caused by Noctuidae.

The photoluminescent material of the present invention has not only a photoluminescence function but also a function to eliminate contaminant substances (e.g., nitrogen oxide and the like), like general zeolite containing metal ions. Therefore, the photoluminescent material of the present invention can be used for the elimination of nitrogen oxide and the like. As shown in the following Examples, since the photoluminescent material of the present invention shows an increased elimination function of nitrogen oxide by UV-irradiation of a particular wavelength, it is considered to have a photocatalytic function in contaminant substance elimination.

A continued use of the photoluminescent material of the present invention for the elimination of nitrogen oxide and the like results in a decreased eliminating function. The photoluminescent material of the present invention having a decreased eliminating function was confirmed to show a decreased luminescence, or optical quenching. Therefore, the photoluminescent material of the present invention also has an indicator function showing a decrease of the function to eliminate nitrogen oxide and the like, based on decreased luminescence intensity or optical quenching.

Furthermore, the photoluminescent material of the present invention may have an antibacterial function, an odor eliminating function, a cedar pollen inactivating function, and a radioactive iodine eliminating function. These functions disappear due to the formation of silver sulfide and the like by the contact of a gas highly reactive with silver (e.g., hydrogen sulfide, methylmercaptan, ethylmercaptan and the like) and the photoluminescent material of the present invention. The disappearance of the function can be easily judged by a decrease of luminescence intensity or optical quenching.

EXAMPLES

The present invention is explained in more detail in the following by referring to Examples, which are not to be construed as limitative. It is possible to modify and practice the invention as long as it does not deviate from the abovementioned and the following descriptions, and all such embodiments are encompassed in the technical scope of the present invention.

Unless particularly specified, "%" means "wt %" in the following.

Example 1

Production of Silver Ion-Containing Zeolite X

Zeolite X (manufactured by Tosoh Corporation: trade name "Zeolum (registered trademark) F-9, powder", particle size: about 1 μm, containing $Na^+$ ion as cation for ion exchange, ion exchange capacity: about 4.8 meq/g) (5 g) was stirred and retained in an aqueous silver nitrate solution (500 mL) at room temperature for 1 hr to perform a silver ion exchange treatment. Aqueous silver nitrate solutions having a concentration of 4.7 mmol/L, 14.1 mmol/L and 23.5 mmol/L were used such that the obtained silver ion-containing zeolite X would have a silver ion content of 5%, 15% and 30%, respectively. The silver ion-containing zeolite X was filtered, and washed with water to give a silver ion-containing zeolite X in wet condition. Moreover, the silver ion-containing zeolite X after washing with water was dried under air atmosphere at 50° C., 100° C. or 180° C. for 5 hr to give a silver ion-containing zeolite X in dry condition. The thus-obtained silver ion-containing zeolite X (0.1 g) was dissolved in 1N nitric acid (100 mL) by an atomic absorption method using atomic absorption spectrophotometer: "Z-2010" manufactured by Hitachi High-Technologies Corporation, and the silver ion content was measured. Additionally, ultraviolet rays (wavelength 254 nm or 365 nm) were irradiated on the obtained silver ion-containing zeolite X by using "VL-4LC" manufactured by VILBER LOURMAT, and the presence or absence of its luminescence (i.e., photoluminescence) and luminescent color were visually observed. In addition, luminescent starting wavelength, ending wavelength and peak wavelength were measured using spectrophotometer F-4500 manufactured by Hitachi, Ltd. The results are shown in the following Table 1-1, Table 1-2 and Table 1-3.

Example 2

Production of Silver Ion-Containing Zeolite Y

Zeolite Y (manufactured by Tosoh Corporation: trade name "HSZ-320NAA, powder", particle size: about 1 μm, containing Na$^+$ ion as cation for ion exchange, ion exchange capacity: about 4.0 meq/g) (5 g) was stirred and retained in an aqueous silver nitrate solution (500 mL) at room temperature for 1 hr to perform a silver ion exchange treatment. Aqueous silver nitrate solutions having a concentration of 4.0 mmol/L, 12.0 mmol/L and 20.0 mmol/L were used such that the obtained silver ion-containing zeolite Y would have a silver ion content of 5%, 15% and 30%, respectively. The silver ion-containing zeolite Y was filtered, washed with water and dried under air atmosphere at 100° C., 180° C. or 1000° C. for 5 hr. The thus-obtained silver ion-containing zeolite Y was measured for silver ion content and photoluminescence in the same manner as in Example 1. The results are shown in the following Table 1-1, Table 1-2 and Table 1-3.

Example 3

Production of Zeolite X Containing Silver Ion and Other Metal Ion

The silver ion-containing zeolite X (design value of silver ion content: 30%, measured value: 24.8%, drying temperature: 50° C.) (1 g) produced in Example 1 was stirred and retained in aqueous zinc sulfate solution, aqueous calcium nitrate solution, aqueous magnesium sulfate solution or aqueous potassium sulfate solution (each 100 mL) at room temperature for 5 hr to perform an exchange treatment of other metal ion (i.e., zinc ion, calcium ion, magnesium ion or potassium ion). The concentrations of aqueous zinc sulfate solution, aqueous calcium nitrate solution, aqueous magnesium sulfate solution and aqueous potassium sulfate solution were adjusted to 4.7 mmol/L, 7.7 mmol/L, 12.6 mmol/L and 7.8 mmol/L, respectively, such that the other metal ion content of the obtained zeolite X containing silver ion and other metal ion would be 3%. Then, the zeolite X containing silver ion and other metal ion was filtered, washed with water and dried under air atmosphere at 50° C. for 5 hr. The thus-obtained zeolite X containing silver ion and other metal ion (0.1 g) was dissolved in 1N nitric acid (100 mL), and the content of other metal ion was measured by an atomic absorption method and using atomic absorption spectrophotometer: "Z-2010" manufactured by Hitachi High-Technologies Corporation. Also, the photoluminescence of the obtained zeolite X containing silver ion and other metal ion was examined in the same manner as in Example 1. These results are shown in the following Table 1-1, Table 1-2 and Table 1-3.

Comparative Example 1

Production of Silver Ion-Containing Zeolite A

Zeolite A (manufactured by Tosoh Corporation: trade name "Zeolum (registered trademark) A-4, powder", particle size: about 1 μm) (5 g) was stirred and retained in an aqueous silver nitrate solution (500 mL) at room temperature for 5 hr to perform a silver ion exchange treatment. Aqueous silver nitrate solutions having a concentration of 5.3 mmol/L, 15.9 mmol/L and 26.5 mmol/L were used such that the obtained silver ion-containing zeolite A would have a silver ion content of 5%, 15% and 30%, respectively. The silver ion-containing zeolite A was filtered, washed with water and dried under air atmosphere at 50° C., 100° C. or 180° C. for 5 hr. The thus-obtained silver ion-containing zeolite A was measured for silver ion content and photoluminescence in the same manner as in Example 1. The results are shown in the following Table 2.

Comparative Example 2

Production of Silver Ion-Containing Zeolite ZSM5

Zeolite ZSM5 (manufactured by UNION SHOWA K.K.: trade name "ABSCENTS 3000 powder", particle size about 1 μm) (5 g) was stirred and retained in an aqueous silver nitrate solution (500 mL) at room temperature for 5 hr to perform a silver ion exchange treatment. Aqueous silver nitrate solution having a concentration of 4.7 mmol/L was used such that the obtained silver ion-containing zeolite ZSM5 would have a silver ion content of 3%. The silver ion-containing zeolite ZSM5 was filtered, washed with water and dried under air atmosphere at 50° C. for 5 hr. The thus-obtained silver ion-containing zeolite ZSM5 was measured for silver ion content and photoluminescence in the same manner as in Example 1. The results are shown in the following Table 2. Hydrophobic ZSM-5 zeolite showed a small ion exchange capacity and, as shown in the following Table 2, the measured value of silver ion content was considerably smaller than the design value.

TABLE 1-1

| | | | silver ion content (%) | | drying |
|---|---|---|---|---|---|
| Ex. | Abbr. | KZ. | design value | measured value | temperature (° C.) |
| 1 | 5Ag-X-wet | X | 5 | 5.1 | — |
| | 15Ag-X-wet | X | 15 | 14.4 | — |
| | 30Ag-X-wet | X | 30 | 24.8 | — |
| | 5Ag-X-50 | X | 5 | 5.1 | 50 |
| | 15Ag-X-50 | X | 15 | 14.4 | 50 |
| | 30Ag-X-50 | X | 30 | 24.8 | 50 |
| | 5Ag-X-100 | X | 5 | 5.1 | 100 |
| | 15Ag-X-100 | X | 15 | 14.4 | 100 |
| | 30Ag-X-100 | X | 30 | 24.8 | 100 |
| | 5Ag-X-180 | X | 5 | 5.1 | 180 |
| | 15Ag-X-180 | X | 15 | 14.4 | 180 |
| | 30Ag-X-180 | X | 30 | 24.8 | 180 |
| 2 | 5Ag-Y-100 | Y | 5 | 4.7 | 100 |
| | 15Ag-Y-100 | Y | 15 | 11.4 | 100 |

TABLE 1-1-continued

| Ex. | Abbr. | KZ. | silver ion content (%) design value | silver ion content (%) measured value | drying temperature (° C.) |
|---|---|---|---|---|---|
| | 30Ag-Y-100 | Y | 30 | 15.8 | 100 |
| | 5Ag-Y-180 | Y | 5 | 4.7 | 180 |
| | 15Ag-Y-180 | Y | 15 | 11.4 | 180 |
| | 30Ag-Y-180 | Y | 30 | 15.8 | 180 |
| | 5Ag-Y-1000 | Y | 5 | 4.7 | 1000 |
| | 15Ag-Y-1000 | Y | 15 | 11.4 | 1000 |
| | 30Ag-Y-1000 | Y | 30 | 15.8 | 1000 |
| 3 | 30Ag/3Zn-X-50 | X | 30 | 24.8 | 50 |
| | 30Ag/3Ca-X-50 | X | 30 | 24.8 | 50 |
| | 30Ag/3Mg-X-50 | X | 30 | 24.8 | 50 |
| | 30Ag/3K-X-50 | X | 30 | 24.8 | 50 |

(Remarks)
Ex. = Example
Abbr. = abbreviation of silver ion-containing zeolite
KZ. = kind of zeolite
30Ag/3Zn-X-50 of Example 3 contained 3.2% of zinc ion (measured value).
30Ag/3Ca-X-50 of Example 3 contained 3.0% of calcium ion of 3.0% (measured value).
30Ag/3Mg-X-50 of Example 3 contained 2.9% of magnesium ion (measured value).
30Ag/3K-X-50 of Example 3 contained 3.1% of potassium ion (measured value).

TABLE 1-2

| | | | Ir. 1 | | | Ir. 2 | | |
|---|---|---|---|---|---|---|---|---|
| Ex. | Abbr. | LC. | LSW. (nm) | LEW. (nm) | PW. (nm) | LC. | LSW. (nm) | LEW. (nm) | PW. (nm) |
| 1 | 5Ag-X-wet | bright yellow | 515 | 717 | 542 | orange | 477 | 669 | 548 |
| | 15Ag-X-wet | lemon | 514 | 703 | 538 | yellow | 460 | 672 | 544 |
| | 30Ag-X-wet | lemon | 513 | 693 | 541 | yellow | 460 | 671 | 544 |
| | 5Ag-X-50 | bright yellow | 515 | 717 | 542 | orange | 477 | 669 | 548 |
| | 15Ag-X-50 | lemon | 514 | 703 | 538 | yellow | 460 | 672 | 544 |
| | 30Ag-X-50 | lemon | 513 | 693 | 541 | yellow | 460 | 671 | 544 |
| | 5Ag-X-100 | bright yellow | 539 | 696 | 539 | orange | 479 | 668 | 540 |
| | 15Ag-X-100 | lemon | 515 | 714 | 537 | yellow | 471 | 674 | 540 |
| | 30Ag-X-100 | lemon | 513 | 699 | 540 | yellow | 467 | 673 | 542 |
| | 5Ag-X-180 | bright yellow | 518 | 687 | 538 | orange | 474 | 670 | 523 |
| | 15Ag-X-180 | lemon | 517 | 688 | 536 | yellow | 460 | 675 | 525 |
| | 30Ag-X-180 | lemon | 512 | 722 | 542 | yellow | 466 | 672 | 526 |

(Remarks)
Ex. = Example
Abbr. = abbreviation of silver ion-containing zeolite
Ir. 1 = irradiation 1 (254 nm ultraviolet ray was irradiated)
Ir. 2 = irradiation 2 (365 nm ultraviolet ray was irradiated)
LC. = luminescent color
LSW. = luminescent starting wavelength
LEW. = luminescent ending wavelength
PW. = peak wavelength

TABLE 1-3

| | | | Ir. 1 | | | Ir. 2 | | |
|---|---|---|---|---|---|---|---|---|
| Ex. | Abbr. | LC. | LSW. (nm) | LEW. (nm) | PW. (nm) | LC. | LSW. (nm) | LEW. (nm) | PW. (nm) |
| 2 | 5Ag-Y-100 | blue-green | 420 | 680 | 493 | light green | 459 | 650 | 513 |
| | 15Ag-Y-100 | blue-green | 401 | 682 | 492 | light green | 461 | 647 | 520 |
| | 30Ag-Y-100 | blue-green | 374 | 705 | 493 | light green | 465 | 651 | 520 |
| | 5Ag-Y-180 | blue-green | 403 | 693 | 493 | light green | 482 | 637 | 513 |
| | 15Ag-Y-180 | blue-green | 403 | 706 | 491 | light green | 460 | 651 | 520 |
| | 30Ag-Y-180 | blue-green | 374 | 714 | 491 | light green | 470 | 646 | 520 |
| | 5Ag-Y-1000 | blue | 275 | 487 | 377 | orange | 595 | 610 | 600 |
| | 15Ag-Y-1000 | blue | 282 | 486 | 386 | white | 394 | 620 | 450 |

TABLE 1-3-continued

|  |  | Ir. 1 | | | Ir. 2 | | | |
| --- | --- | --- | --- | --- | --- | --- | --- | --- |
| Ex. | Abbr. | LC. | LSW. (nm) | LEW. (nm) | PW. (nm) | LC. | LSW. (nm) | LEW. (nm) | PW. (nm) |

| Ex. | Abbr. | LC. | LSW. (nm) | LEW. (nm) | PW. (nm) | LC. | LSW. (nm) | LEW. (nm) | PW. (nm) |
| --- | --- | --- | --- | --- | --- | --- | --- | --- | --- |
|  | 30Ag-Y-1000 | blue | 291 | 487 | 389 | white | 395 | 650 | 455 |
| 3 | 30Ag/3Zn-X-50 | yellow-green | 513 | 679 | 542 | yellow | 464 | 674 | 546 |
|  | 30Ag/3Ca-X-50 | yellow-green | 521 | 700 | 536 | yellow | 508 | 636 | 516 |
|  | 30Ag/3Mg-X-50 | yellow | 518 | 682 | 543 | yellow | 508 | 700 | 535 |
|  | 30Ag/3K-X-50 | yellow | 518 | 700 | 538 | orange | 503 | 700 | 548 |

(Remarks)
Ex. = Example
Abbr. = abbreviation of silver ion-containing zeolite
Ir. 1 = irradiation 1 (254 nm ultraviolet ray was irradiated)
Ir. 2 = irradiation 2 (365 nm ultraviolet ray was irradiated)
LC. = luminescent color
LSW. = luminescent starting wavelength
LEW. = luminescent ending wavelength
PW. = peak wavelength

TABLE 2

| Comp. Ex. | Abbr. | KZ. | silver ion content (%) | | drying temperature (° C.) | Ir. 1 luminescence | Ir. 2 luminescence |
| --- | --- | --- | --- | --- | --- | --- | --- |
|  |  |  | design value | measured value |  |  |  |
| 1 | 5Ag-A-50 | A | 5 | 5.6 | 50 | none | none |
|  | 15Ag-A-50 | A | 15 | 16.7 | 50 | none | none |
|  | 30Ag-A-50 | A | 30 | 27.5 | 50 | none | none |
|  | 5Ag-A-100 | A | 5 | 5.6 | 100 | none | none |
|  | 15Ag-A-100 | A | 15 | 16.7 | 100 | none | none |
|  | 30Ag-A-100 | A | 30 | 27.5 | 100 | none | none |
|  | 5Ag-A-180 | A | 5 | 5.6 | 180 | none | none |
|  | 15Ag-A-180 | A | 15 | 16.7 | 180 | none | none |
|  | 30Ag-A-180 | A | 30 | 27.5 | 180 | none | none |
| 2 | 3Ag-ZSM5-50 | ZSM5 | 3 | 1.8 | 50 | none | none |

(Remarks)
Comp. Ex. = Comparative Example
Abbr. = abbreviation of silver ion-containing zeolite
KZ. = kind of zeolite
Ir. 1 = irradiation 1 (254 nm ultraviolet ray was irradiated)
Ir. 2 = irradiation 2 (365 nm ultraviolet ray was irradiated)

As shown in the above-mentioned Table 1-2 and Table 1-3, zeolite X and zeolite Y containing silver ion, which were produced in Examples 1-3, emit visible light at 254 nm and 365 nm UV-irradiation, and function as a photoluminescent material. The presence of a width between the luminescent starting wavelength and the ending wavelength suggests that a mixture of photoluminescent materials having different luminescence wavelengths was obtained in Examples 1-3. Particularly, 15Ag—Y-1000 and 30Ag—Y-1000 produced in Example 2 emit a somewhat bluey white light by 365 nm UV-irradiation (i.e., irradiation 2). In contrast, as shown in the above-mentioned Table 2, the zeolite A and zeolite ZSM5 containing silver ion, which were produced in Comparative Examples 1 and 2, did not emit a visible light even by irradiation of ultraviolet ray.

Experimental Example 1

Experiment of Elimination of Nitrogen Dioxide

The silver ion-containing zeolite X (abbreviation: "30Ag—X-180", silver ion content measured value: 24.8%) produced in Example 1, the silver ion-containing zeolite Y (abbreviation: "30Ag—Y-180", silver ion content measured value: 15.8%) produced in Example 2, and the silver ion-containing zeolite A (abbreviation: "30Ag-A-180", silver ion content measured value: 27.5%) produced in Comparative Example 1 were used for the nitrogen dioxide elimination experiment. To be specific, a gas (1.5 L) having a nitrogen dioxide concentration of 100 ppm was placed in a gas bag, silver ion-containing zeolite (0.2 g) was placed in the gas bag, and the nitrogen dioxide concentration at room temperature was measured using a detector tube. The nitrogen dioxide concentration before charging silver ion-containing zeolite in the gas bag (before experiment), and the nitrogen dioxide concentration 30 min, 60 min and 120 min after placing the silver ion-containing zeolite are shown in the following Table 3.

In this experiment, the concentration of nitrogen dioxide in the gas bag upon irradiation of ultraviolet ray at wavelength 352 nm on silver ion-containing zeolite at room temperature was also measured using a TOSHIBA black-light blue fluorescent lamp (FL20S/BL-B). The UV-irradiation distance (i.e., distance between silver ion-containing zeolite and fluorescent lamp) in this case was 14 cm, and the ultraviolet ray intensity was about 0.4 mW/cm². For confirmation of inability of UV-irradiation to decompose nitrogen dioxide, a blank experiment with UV-irradiation alone and not using silver ion-containing zeolite was performed, and the nitrogen dioxide concentration was also measured. The results are shown in the following Table 3.

In addition, ultraviolet ray having a wavelength of 352 nm was irradiated at room temperature on the silver ion-containing zeolite before and after experiment and luminescence was visually observed. The presence or absence of the luminescence and strength thereof are shown in the following Table 3.

TABLE 3

| Ex. No. | Abbr. | UV-irradiation | nitrogen dioxide concentration (ppm) | | | | luminescence | |
| | | | before Ex. | 30 min | 60 min | 120 min | before Ex. | after Ex. |
|---|---|---|---|---|---|---|---|---|
| 1 | 30Ag-X-180 | absent | 100 | 30 | 20 | 10 | strong | weak |
| 2 | 30Ag-Y-180 | | 100 | 30 | 16 | 6 | strong | weak |
| 3 | 30Ag-A-180 | | 100 | 50 | 30 | 20 | none | none |
| 4 | 30Ag-X-180 | present | 100 | 10 | 3.5 | 2.5 | strong | weak |
| 5 | 30Ag-Y-180 | | 100 | 2.5 | N.D. | N.D. | strong | weak |
| 6 | 30Ag-A-180 | | 100 | 28 | 14 | 10 | none | none |
| 7 | none | present | 100 | 100 | 100 | 100 | — | — |

(Remarks)
Ex. No. = Experiment No.
Abbr. = abbreviation of silver ion-containing zeolite
before Ex. = before experiment
after Ex. = after experiment
N.D. = not determined The silver ion-containing zeolites (30Ag—X-180 and 30Ag—Y-180) of the present invention showed a strong luminescence by UV-irradiation before nitrogen dioxide elimination experiment. After the experiment, however, the luminescence became weak. The silver ion-containing zeolite with weakened luminescence of the present invention was confirmed to show decreased nitrogen dioxide elimination ability. Using the silver ion-containing zeolite of the present invention for elimination of nitrogen dioxide, therefore, a decrease of the nitrogen dioxide elimination ability can be known from a decrease of the luminescence intensity. That is, the silver ion-containing zeolite of the present invention also has an indicator function that shows a decrease of nitrogen dioxide elimination ability. On the other hand, the silver ion-containing zeolite (30Ag-A-180) of Comparative Example does not show photoluminescence and does not have an indicator function.

In addition, the silver ion-containing zeolites (30Ag—X-180 and 30Ag—Y-180) of the present invention showed drastically increased nitrogen dioxide elimination ability by UV-irradiation. This is because the silver ion-containing zeolite of the present invention develops a photocatalytic function during elimination of nitrogen dioxide.

INDUSTRIAL APPLICABILITY

The photoluminescent material of the present invention (silver ion-containing faujasite type zeolite) can be utilized as a luminescent paint for forgery prevention of paper money and the like, a lighting equipment and the like. Since the photoluminescent material of the present invention does not show photoluminescence upon adsorption and elimination of a contaminant substance (e.g., nitrogen oxide and the like), it can also be used as an indicator showing a decrease or disappearance of contaminant substance elimination ability.

This application is based on a patent application No. 2010-173726 filed in Japan, the contents of which are incorporated in full herein.

The invention claimed is:

1. A photoluminescent material, which is a silver ion-containing faujasite type zeolite and emits a visible light by irradiation of ultraviolet ray.

2. The photoluminescent material according to claim 1, which emits a visible light by irradiation of ultraviolet ray having a wavelength of not less than 200 nm and less than 380 nm.

3. The photoluminescent material according to claim 1, wherein the silver ion content is more than 1 wt % and not more than 30 wt % of the whole photoluminescent material.

4. The photoluminescent material according to claim 1, wherein the faujasite type zeolite is zeolite X.

5. The photoluminescent material according to claim 1, further comprising at least one selected from the group consisting of zinc ion, calcium ion, magnesium ion and potassium ion.

6. The photoluminescent material according to claim 1, further comprising calcium ion.

7. A lighting equipment comprising an ultraviolet light source and the photoluminescent material according to claim 1.

8. The lighting equipment according to claim 7, which is a back light for a liquid crystal display device.

9. The photoluminescent material according to claim 1, for use for elimination of nitrogen oxide.

* * * * *